A. RIOUX.
WATER METER ALARM.
APPLICATION FILED JULY 14, 1909.

975,072.

Patented Nov. 8, 1910.
2 SHEETS—SHEET 1.

Witnesses
J. M. Fowler Jr.
A. L. Kitchin

Inventor
Alphonse Rioux
By Mason Fenwick Lawrence
his Attorneys

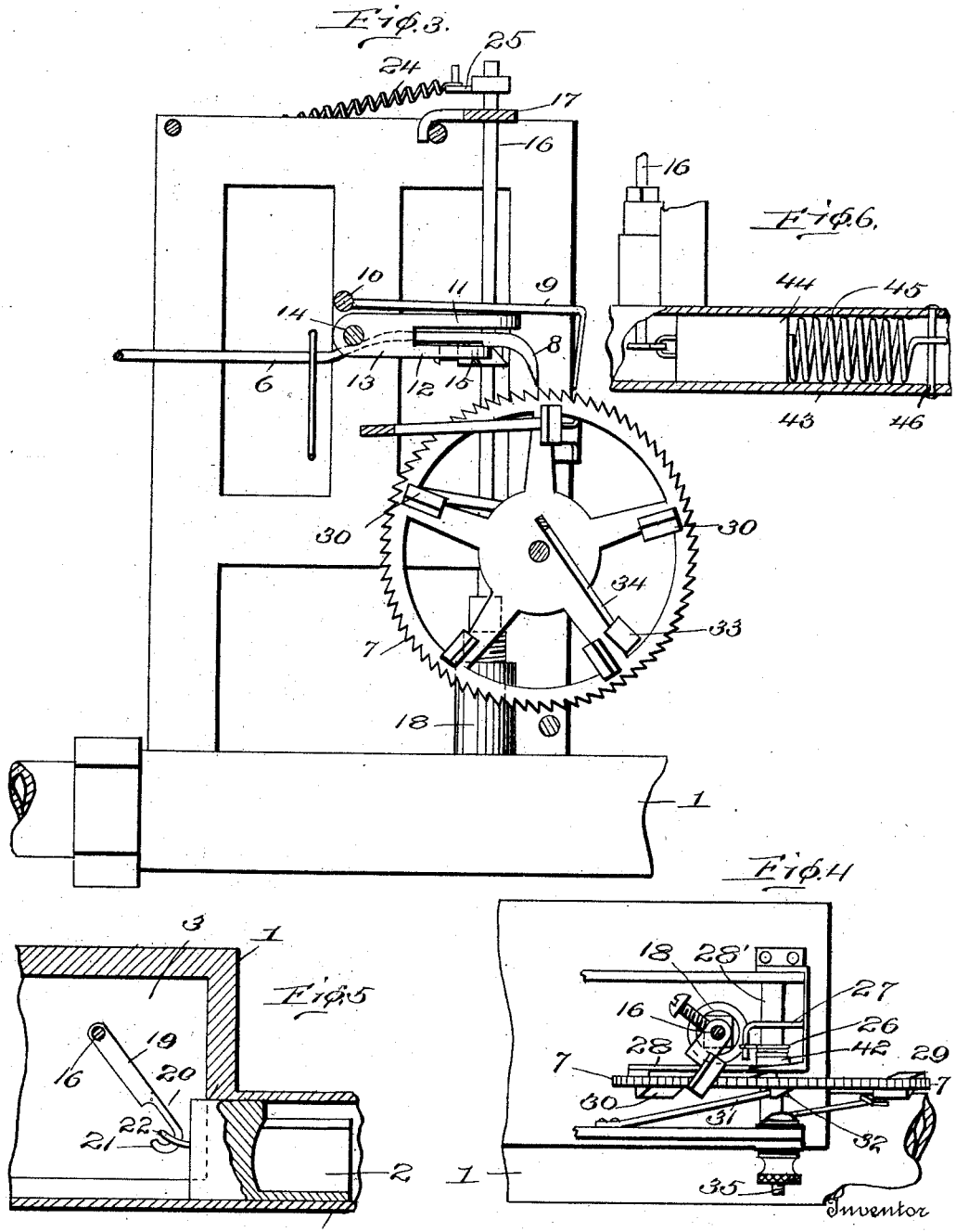

UNITED STATES PATENT OFFICE.

ALPHONSE RIOUX, OF NASHUA, NEW HAMPSHIRE.

WATER-METER ALARM.

975,072.  Specification of Letters Patent.  Patented Nov. 8, 1910.

Application filed July 14, 1909. Serial No. 507,562.

*To all whom it may concern:*

Be it known that I, ALPHONSE RIOUX, a citizen of the United States, residing at Nashua, in the county of Hillsboro and State of New Hampshire, have invented certain new and useful Improvements in Water-Meter Alarms; and I do hereby declare the following to be a full, clear, and exact description of the invention, such as will enable others skilled in the art to which it appertains to make and use the same.

This invention relates to improvements in alarms, and particularly to water meter alarms, and has for an object the arrangement of means for causing an alarm to be sounded when more than a predetermined amount of water has passed through the meter.

Another object of the invention is the arrangement of a rotating wheel and valve member associated therewith, together with means operated by a meter for rotating the wheel, the wheel in turn being arranged to close an alarm circuit at predetermined intervals during its rotation whereby upon each closing of the alarm circuit is indicated a predetermined amount of water having been passed through the meter.

A still further object of the invention is the arrangement of a water meter in combination with an alarm mechanism operated by the water meter for sounding a signal without turning off the water when a predetermined amount has passed through the meter, the alarm mechanism being formed with means for moving back to its starting point if said predetermined amount of water has not passed through said meter in one continuous stream, so that smaller amounts of water passing through the meter than the predetermined amount will not sound the alarm.

With these and other objects in view the invention comprises certain novel constructions, combinations and arrangement of parts as will be hereinafter more fully described and claimed.

Figure 1:
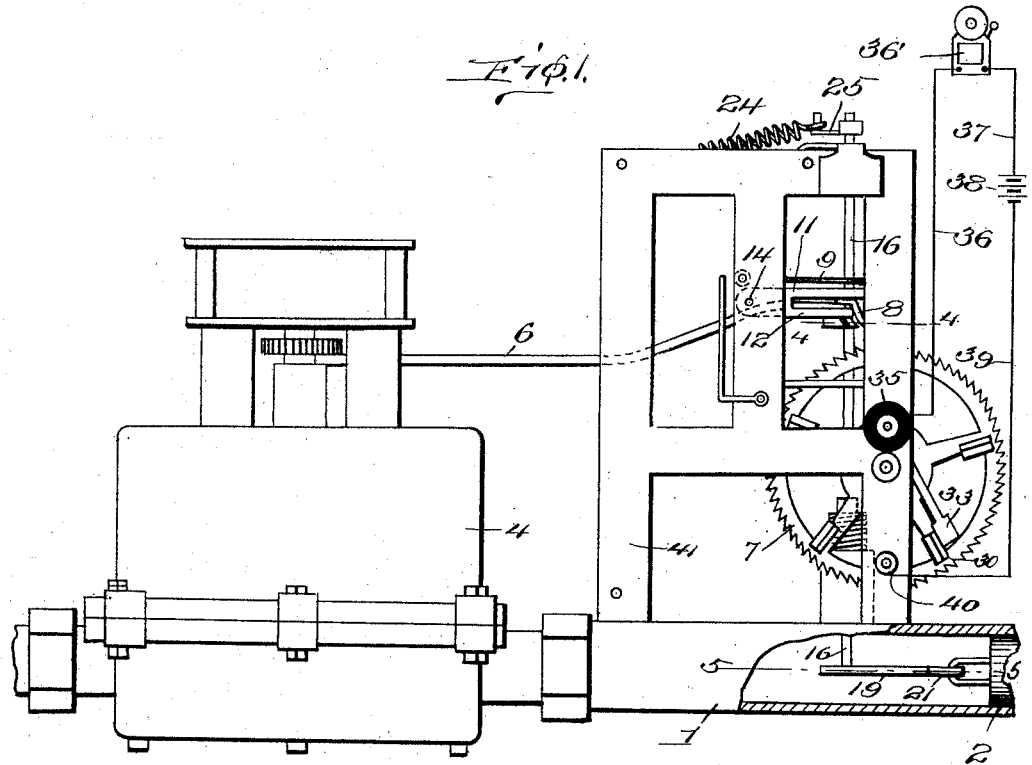
Figure 2:
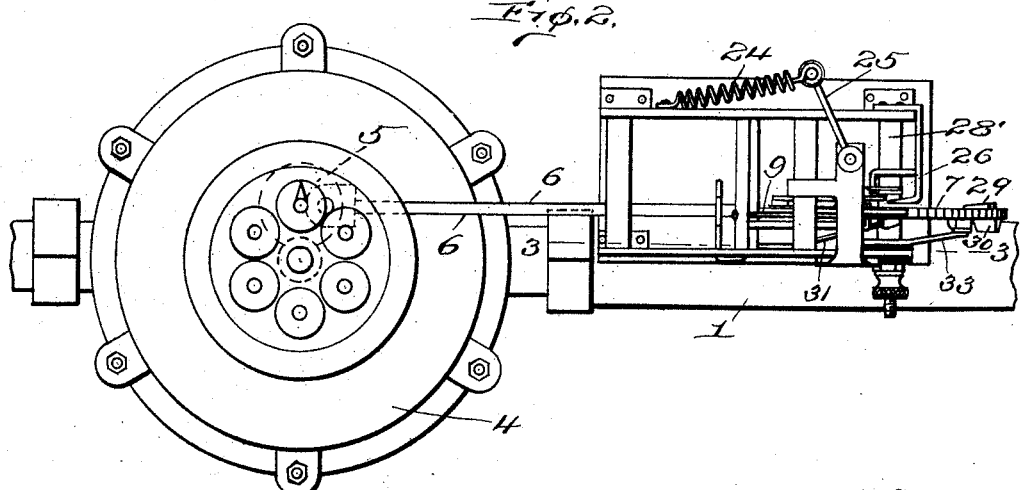

In the accompanying drawings: Figure 1 is a side elevation of a meter and alarm mechanism, embodying the invention. Fig. 2 is a top plan view of the structure shown in Fig. 1. Fig. 3 is an enlarged sectional view, approximately on line 3—3 of Fig. 2. Fig. 4 is an enlarged fragmentary sectional view, approximately on line 4—4 of Fig. 1. Fig. 5 is a section through Fig. 1, approximately on line 5—5. Fig. 6 is a detail fragmentary view of a slightly modified form of valve, certain parts being broken away to better disclose the construction of the valve.

In constructing an alarm mechanism embodying the invention it is designed to present means to give an alarm notice of any use of water at one drawing beyond any definitely fixed number of feet. If less than the definite number of feet fixed for operating the alarm is drawn, and the flow is stopped the alarm mechanism will move back to its original position, and the next time water is drawn through the meter the alarm mechanism must again travel from its starting point to the place for causing the alarm if the predetermined number of feet has been drawn, but if not drawn at the second time and the flow is again stopped the alarm mechanism will again go back to its starting point. The alarm mechanism is designed to give an alarm automatically upon the flowing of a predetermined and fixed number of feet through the meter without in any way stopping the flow of the water passing through the meter, even though the water is escaping through a leak or open valve or spigot. In case the water is escaping through a spigot that is accidentally left open or otherwise or through a leak, the alarm mechanism will give a signal as often as the predetermined amount of water has passed through the meter. The alarm will continue to be sounded at intervals until the water has been stopped from flowing through the meter.

In order that the invention may be more clearly understood, an embodiment of the same is shown in the accompanying drawings, in which 1 indicates the base of the alarm mechanism to which is secured the supply pipe through which water or other fluid may pass into base 1, valve 2 being pushed into the hollowed out portion 3 of base 1 for permitting the flowing of the water or other fluid. The water continues to flow through hollowed out portion 3, and from thence into meter 4, which may be of any desired description with the usual dial face for indicating the number of cubic feet of water passed through the meter, and any desired kind of means for operating the dial, including a wheel 5, to which is pivotally secured an arm 6 so that when the meter is registering water passing therethrough wheel 5 will be rotated and arm 6 reciprocated, either slowly or fast, according to the flow of water. Arm 6 in its reciprocation is designed to engage a toothed wheel 7 by means of a widened out portion 8, which is sharpened or beveled for easily engaging the teeth or notches on wheel 7. The end or widened out portion 8 is designed to engage wheel 7 and move the same forward a short distance, then slip over one or more teeth on its return stroke, preparatory to forcing wheel 7 forward a short distance upon its next outer stroke. At the same time that end 8 engages wheel 7 a pawl or stop 9 engages the teeth on wheel 7 for preventing any reverse rotation thereof. Pawl 9 is pivotally mounted at 10 and normally drops by gravity into engagement with the notches on wheel 7 when its supporting arm 11 has been permitted to move downward by gravity a sufficient distance. Arm 12, constructed similar to arm 11, is designed to support end 8 above and out of contact with wheel 7 when no water is flowing from meter 4. Arms 11 and 12 merge into an integral end 13, which has passed therethrough a pivotal pin 14, whereby the arms 11 and 12 are moved in unison in order that pawl 9 will engage wheel 7 at the same time that end 8 engages wheel 7. By this means whenever end 8 moves wheel 7 forward pawl 9 will prevent any reverse rotation thereof.

A cam 15 is arranged to support arm 12 and also arm 11, so as to hold end 8 and pawl 9 out of engagement with wheel 7 when no water is flowing through the meter, but is designed to be moved from beneath arm 12 for permitting end 8 and pawl 9 to drop against wheel 7 when water is flowing through the meter. Cam 15 is rigidly secured to a shaft 16 designed to partially rotate back and forth. Shaft 16 is journaled in a cross bar 17 and in a bearing 18. Bearing 18 is preferably provided with a stuffing box of any desired kind, so as to prevent any water from opening 3, into which shaft 16 projects, from escaping. Shaft 16 has rigidly secured at its lower end an arm 19 formed with a reduced portion 20 and a hook shaped end 21. The hooked shaped end 21 is designed to pass through an eye 22 which is rigidly secured to a valve 2 formed in a tubular extension 23 of base 1. The water supply pipe (not shown) is secured to extension 23, so that when the spigot is turned on and water flows through the meter the same will force valve 2 into, or partially into, opening 3. Valve 2, when forced into opening 3, will move arm 19, and consequently move shaft 16 against the action of retractile spring 24. As arm 19 is moved by valve 2, and shaft 16 partially rotated, cam 15 will be moved from beneath arm 12, so that as soon as the meter begins to operate and arm 6 begins to reciprocate the same will be in engagement with wheel 7 for rotating the same. As soon as the water is turned off so that no more will pass through the meter 4, spring 24 acting on arm 25 will rotate shaft 16 in an opposite direction, and force valve 2 back to substantially the position shown in Fig. 5. Cam 15 is also rotated back to substantially the position shown in Fig. 3, and during its movement back to its original position will engage and raise arm 12, and also arm 11 for moving end 8 and pawl 9 out of engagement with wheel 7. If wheel 7 has not been moved a predetermined distance, as hereinafter fully described, the same will move back to its original position as soon as end 8 and pawl 9 have been disengaged therefrom. The return movement of wheel 7 is caused by spring 26 acting against stop 27, and against arm 28, which bears against one of the lugs 29 secured to wheel 7.

Secured to wheel 7, opposite lugs 29, are a plurality of lugs 30 formed with a surface at right angles to wheel 7 for a spring pawl 31 to engage, and are also formed with a beveled surface 32 for a contact member 33 to engage. Contact member 33 is supported by a spring 34, which is secured to a binding post 35. A wire 36 extends from binding post 35 to an alarm, as bell 36'. From bell 36' wire 37 extends to a battery 38. From battery 38 a wire 39 extends to a binding post 40 secured to the framework 41 upon which the various operating parts of the mechanism are mounted. The binding post 40 acts as a ground so that when contact member 33 is in engagement with any of the lugs 30 current will flow from battery 38, through wire 39, binding post 40, framework 41, from thence to wheel 7, from wheel 7 through lugs 30, contact 33, spring 34, binding post 35, wire 36, bell 36', and through wire 37 back to battery 38. Any desired number of lugs 30 may be placed on wheel 7, spaced an equal distance apart, there being five shown on the drawing as an illustration. The lugs can be arranged a sufficient distance apart so as to indicate any predetermined amount of water passing through the meter, while the wheel 7 is traveling forward so that the contact member 33 will become disengaged from one lug, and will engage the next succeeding lug.

At each engagement of contact 33 with the respective lugs 30, bell 36' will be sounded. For instance if 10 cubic feet of water flows through meter 4 while wheel 7 was rotated a one-fifth of a revolution the mechanism would then sound an alarm immediately after ten cubic feet of water had passed through the meter. If, for instance, 30 cubic feet of water had passed through the meter the alarm would sound three times at intervals. If less than 10 cubic feet of water passes through the meter wheel 7 would rotate less than a one-fifth complete rotation, and upon the stopping of the water end 8 and pawl 9 will be raised and spring 26 force wheel 7 back to its starting point. Regardless of whether or not more or less than 10 cubic feet of water has passed through the meter cam 15 will be moved upon the shutting off of the water for causing end 8 and pawl 9 to be raised. The stops 30 are designed to engage the spring pawl 31 when end 8 and pawl 9 have been raised regardless of the amount of water passed through the meter. When wheel 7 is being forced around one of the stops 29 will engage arm 28 and move the same around its pivotal shaft 28', and bring spring 26 under tension. Arm 28 will continue to be moved by lug 29 until the point of cam 42 passes between arm 28 and wheel 7. Any further movement of the arm under action of lug 29 will cause the arm to be moved out away from wheel 7 until the end of arm 28 has been disengaged from the lug 29, which was moving the same. As soon as arm 28 has been freed from the lug that was moving the same the arm will be rotated under action of spring 26, until stopped by the next succeeding lug 29. The continued rotation of the wheel 7 will again move arm 28 forward until again released by cam 42, whereupon it will quickly move back to the next succeeding lug. This operation is continued as long as any water is flowing through the meter. By this arrangement when a predetermined amount of water has been passed through the meter, as for instance 10 cubic feet, cam 42 will release arm 28. If less than 10 cubic feet is passed through the meter and then the meter caused to stop arm 28 actuated by spring 26 will return wheel 7 to its original position with one of the lugs 30 against spring pawl 31.

In Fig. 6 is shown a slightly modified form of valve mechanism which may be used in place of the valve mechanism shown in Fig. 5. Referring more particularly to Fig. 6, 43 indicates an extension similar to extension 23 of the preferred structure, in which is located a valve member 44 similar to valve member 2, but which has secured thereto a retractile spring 45 to take the place of retractile spring 24. Spring 45 is secured to a pin 46 so that whenever valve 44 has been moved to an open position by the water the same will be moved automatically to a closed position by the spring when the water ceases to flow.

What I claim is:

1. In a meter alarm mechanism, the combination with a meter, of an arm connected therewith and designed to be reciprocated thereby, said arm being formed with a hook-shaped end, a wheel engaged by said hook-shaped end, and rotated thereby when the same is moved by the passage of water through said meter, an electrical alarm, contact for said electrical alarm closed by said wheel rotating a predetermined distance, and means for returning said wheel to its starting point without closing said contacts when less than a predetermined amount of water has passed through said meter.

2. In a meter alarm mechanism, the combination with a meter, of an arm actuated by said meter, a wheel rotated by said arm, means for throwing said arm into engagement with said wheel upon the movement of fluid through said meter, said means being designed to lift said arm from engagement with said wheel upon the ceasing of the flow of fluid through said meter, means for returning said wheel to its starting point when said arm has been lifted out of engagement therewith, an alarm and means for sounding said alarm when said wheel has been moved a predetermined distance.

3. In a meter alarm mechanism, the combination with a meter, of an arm extending therefrom and operated thereby, a rockable shaft, a cam mounted on said shaft, a pivotally mounted lever actuated by said cam for raising said arm, a spring connected with said shaft for causing said shaft to move said cam to such a position as to normally hold elevated said lever, a plug actuated by the water passing through said meter for moving said shaft against the action of said spring, whereby said cam is moved from beneath said lever, and said arm is permitted to move down by gravity, a wheel adapted to be engaged by said arm when the same has moved downward by gravity and designed to be rotated thereby as the arm is moved by said meter, an alarm mechanism connected with said wheel and operated at predetermined intervals during the flow of water through said meter.

4. In a meter alarm mechanism, the combination with a meter, of an arm actuated thereby upon the passage of fluid therethrough, a wheel actuated by said arm, means for permitting said arm to move by gravity into engagement with said wheel when fluid is passing through said meter, means for disengaging said arm from said wheel when the flow of fluid has ceased, means for sounding an alarm connected with said wheel and adapted to be operated upon the rotation of said wheel a predetermined distance, and means for returning said wheel to its original position without sounding an alarm when said wheel has not been rotated said predetermined distance and said fluid has ceased to flow through said meter.

5. In a meter alarm mechanism, the combination with a meter, of an arm actuated by said meter upon the passage of fluid through said meter, a wheel actuated by said arm, means for returning said wheel to its original position, a pawl for normally preventing such return, a cam for lifting said arm and said pawl for permitting the return of said wheel to its original position, a spring for operating said cam for raising said arm and said pawl when fluid has ceased to flow through said meter, and an alarm connected with said wheel adapted to be operated when said wheel has been moved a predetermined distance, but designed not to be operated when moved less than a predetermined distance.

6. In a meter alarm mechanism, the combination of a meter, of an arm actuated by said meter upon the flowing of fluid through said meter, an alarm device proper, means actuated by said arm for causing said alarm device proper to sound an alarm when said means have been moved a predetermined distance, and means for returning said first mentioned means to its original position without causing said alarm mechanism proper to sound an alarm when said first mentioned means has been moved less than said predetermined distance.

In testimony whereof I affix my signature in presence of two witnesses.

ALPHONSE RIOUX.

Witnesses:
C. ISABELLE BAKER,
GEORGE W. CLYDE.